United States Patent [19]

Gombos

[11] Patent Number: 5,001,974
[45] Date of Patent: Mar. 26, 1991

[54] HAY BALE RECOMPACTING SYSTEM

[75] Inventor: John M. Gombos, Bakersfield, Calif.

[73] Assignee: A.C.X., Inc., Bakersfield, Calif.

[21] Appl. No.: 353,811

[22] Filed: May 17, 1989

[51] Int. Cl.$^5$ .......................... B65B 57/10; B30B 9/30
[52] U.S. Cl. .......................................... 100/4; 100/6;
100/7; 100/14; 100/26; 100/95; 100/99;
100/188 R; 100/215; 100/218; 100/232;
100/244
[58] Field of Search .......................... 100/3, 4, 6, 7, 14,
100/26, 29, 32, 95, 215, 218, 232, 244, 249, 264,
25, 188 R

[56] References Cited

U.S. PATENT DOCUMENTS

| | | | |
|---|---|---|---|
| 250,135 | 11/1881 | Dederick | 100/3 |
| 677,148 | 6/1901 | Webb | 100/3 |
| 3,438,320 | 4/1969 | Raab | 100/244 X |
| 3,576,161 | 4/1971 | Wright | 100/25 |
| 3,613,556 | 10/1971 | Wright | 100/14 |
| 4,040,230 | 8/1977 | Pessel et al. | 100/99 X |
| 4,090,440 | 5/1978 | Jensen | 100/4 |
| 4,150,613 | 4/1979 | Smee et al. | 100/215 X |
| 4,334,466 | 6/1982 | Spiegelberg | 100/7 X |
| 4,343,131 | 8/1982 | McCormick et al. | 100/7 X |
| 4,403,542 | 9/1983 | Lewis | 100/4 X |
| 4,763,574 | 8/1988 | Ast | 100/7 X |
| 4,936,206 | 6/1990 | Miles et al. | 100/3 |

FOREIGN PATENT DOCUMENTS

| | | | |
|---|---|---|---|
| 650785 | 10/1962 | Canada | 100/215 |
| 59-191596 | 10/1984 | Japan | 100/232 |
| 965906 | 8/1964 | United Kingdom | 100/3 |

Primary Examiner—Harvey C. Hornsby
Assistant Examiner—Stephen F. Gerrity
Attorney, Agent, or Firm—Baker, Maxham, Jester & Meador

[57] ABSTRACT

A hay bale recompacting system comprises an elongated compression chamber having a generally rectangular cross-section defined by top, bottom, and end walls, an inlet end and an outlet end, an inlet opening at the inlet end in one side of the chamber, an outlet at the outlet end in the other side of the chamber, a ram at the inlet end of the chamber for compressing bales therein, an indexing apparatus for weighing a charge to be introduced into the compressor, a ram for moving a selected amount of a bale into the chamber, a strapping chamber at the outlet disposed at right angle to the compression chamber for receiving compressed bales, an extruder ram for extruding bales from the compression chamber into and from the strapping chamber, and strapping units associated with the strapping chamber for strapping bales in the strapping chamber.

24 Claims, 3 Drawing Sheets

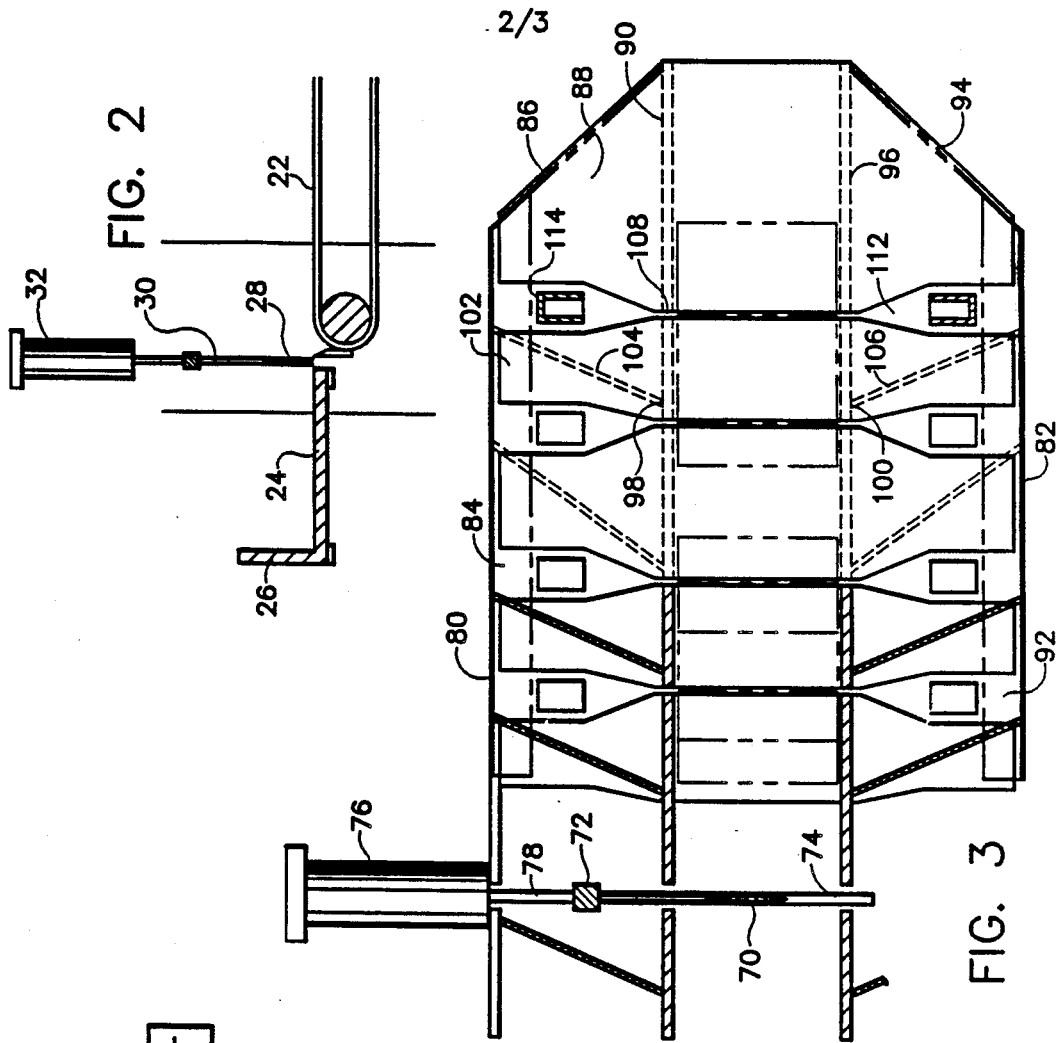
FIG. 2
FIG. 3
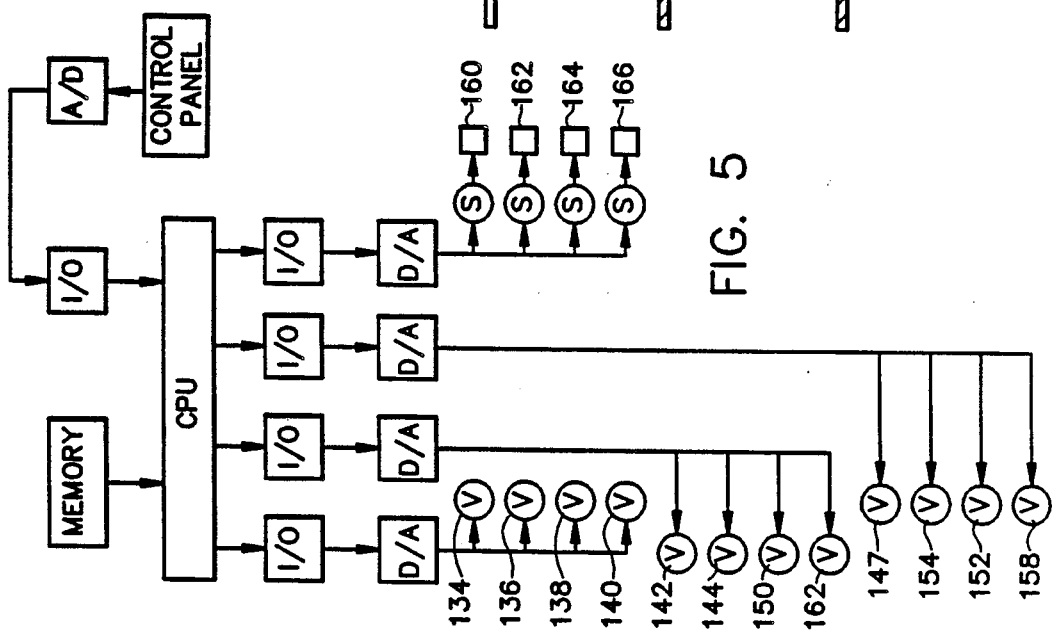
FIG. 5

HAY BALE RECOMPACTING SYSTEM

BACKGROUND OF THE INVENTION

The present invention relates to an apparatus for recompacting materials into high density packages and pertains particularly to an apparatus for the recompacting of bales of hay into high density compact units.

There has, in recent years, developed an international market for domestically produced hay. In order to meet the needs of this market, the hay must be packaged to provide for efficient and economical handling and shipping.

Hay, after being cut and dried in the field, is typically compressed and bound into bales for easier handling and storage. In the past, the typical field baled bale of hay for local use typically weighs about 55 pounds and occupies a space of about 48"×23"×17". The weight may vary by as much as 20% under certain circumstances. Bales of this size and weight are generally considered suitable for local handling and storage. However, they are considered too bulky for commercial markets and for long distance shipping, particularly for overseas shipping. For this reason, the standard commercial bale is about 110 pounds and the same dimensions as above.

It has been found that such bales weighing 50 Kg or 110 lb. can be compacted into a single bale of about 18"×24"×20". These can then be split into 18"×12"×20" bales and stacked and bound into twenty ton units for shipment. Also, two bales of the 25 Kg or 55 lb. weight can be compacted into a single bale of the aforesaid size and weight. This recompacting or rebaling conserves considerable cargo space and provides easier handling units for existing cargo handling and loading equipment.

The recompacting of bales of hay and an apparatus therefor has been proposed by Jensen in U.S. Pat. 4,090,440, issued May 23, 1978. The apparatus therein however has a number of drawbacks. For example, the bales are not of uniform weight, and a single bale is recompressed into a bale of about one-half its original length. Another problem is that the restrapping is provided for in the compression chamber.

It is desirable that improved means be available for the recompacting of bales of hay.

SUMMARY AND OBJECTS OF THE INVENTION

It is the primary object of the present invention to provide an improved system for the recompacting and baling of hay into compact high density bales.

BRIEF DESCRIPTION OF THE DRAWING

The above and other objects and advantages of the present invention will become apparent from the following description when read in conjunction with the accompanying drawings wherein:

FIG. 2 is a view taken on line II—II of FIG. 1;

FIG. 3 is a view taken on line III—III of FIG. 1;

FIG. 5 is a functional block diagram of a control system for the embodiment of FIG. 1.

DETAILED DESCRIPTION OF A PREFERRED EMBODIMENT

Figure 1:
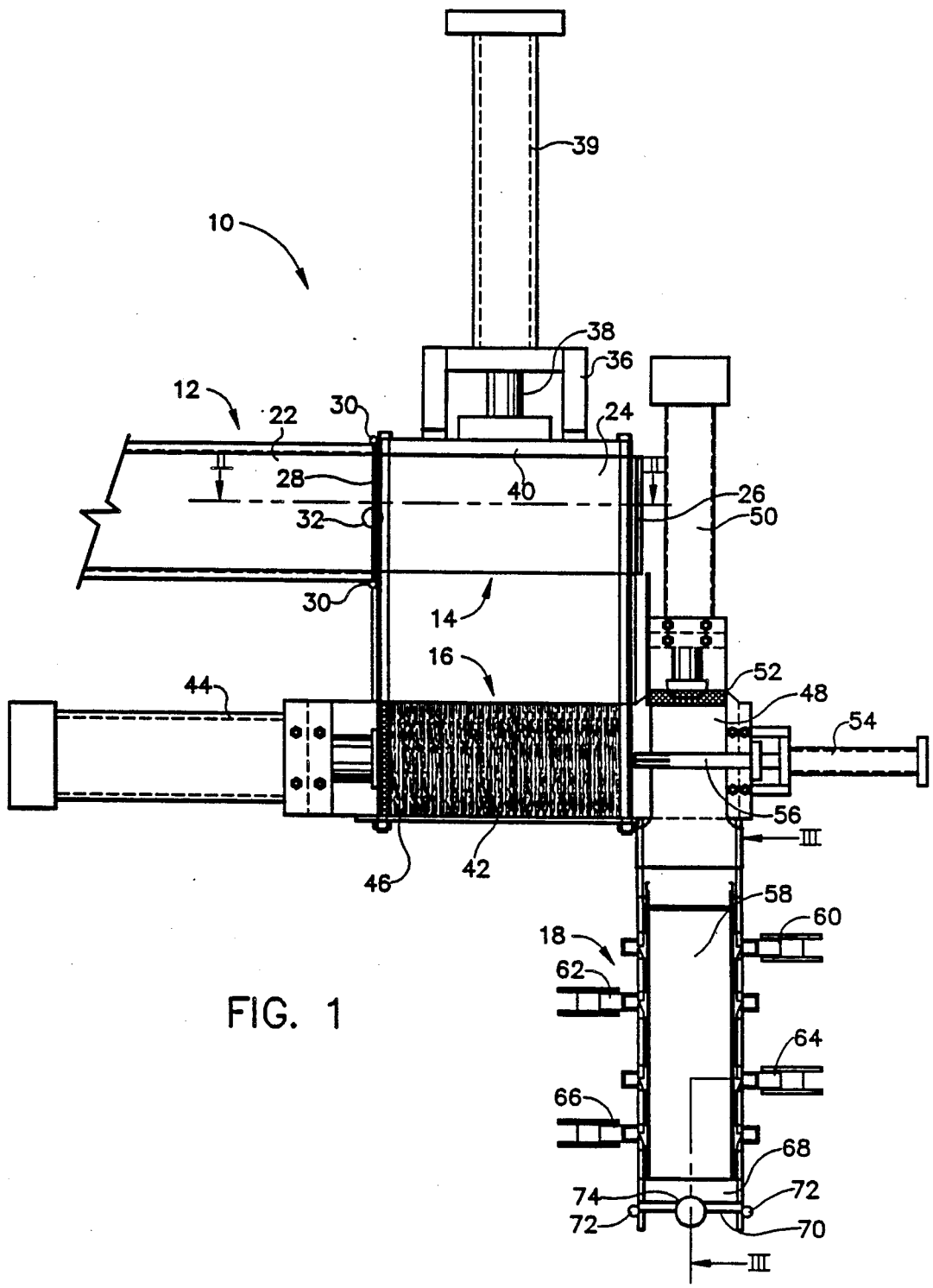
FIG. 1 is top plan view illustrating a preferred embodiment of the invention.

Referring to the drawings, particularly to FIG. 1, there is illustrated a preferred embodiment of a system in accordance with the present invention. The system, in its preferred form, takes a specifically selected charge of hay, feeds it into a compression chamber, and compresses it into a bale of a specific and uniform size and weight, bands the reduced size bale, and cuts it into two uniform sizes.

The illustrated embodiment, designated overall generally by the numeral 10, comprises in its preferred embodiment a conveyor means or system, designated generally by the numeral 12, for conveying broken bales of hay onto an indexing unit 14. The indexing unit in its preferred form includes scales and a gate or the like for selectively allowing a predetermined amount or weight of hay onto the indexing table. Thereafter, the indexing unit feeds it into a compression chamber, designated generally by the numeral 16, where the hay is compressed into a substantially smaller bale of about 20 inches in length. This compressed bale is extruded transverse to the compression chamber through a strapping chamber, designated generally by the numeral 18. In the strapping chamber, the bales are bound with two pairs of straps by strapping means and then passed to a cutting unit 20 for cutting the bales into uniform units.

The conveyor 12 may be of any suitable well known type, such as a belt conveyor, with a belt 22 that continuously runs and preferably is adjustable in speed to accommodate or provide adequate feeding for the compressing function. A belt conveyor that enables the load to slip thereon (i.e. the belt to continuously run beneath the bale) is suitable. The conveyor feeds the hay onto the indexing platform 24, which in its preferred form is the platform of a scale.

The indexing unit (FIGS. 1 and 2) comprises a support platform 24 on which the bales of hay are pushed, and at the forward end thereof includes a stop 26 for containing or confining the hay to the platform, which in its preferred form is the platform of a suitable scale. Suitable scales are commercially available and any suitable type may be utilized, such as for example that disclosed in U.S. Pat. No. 4,601,356, which is incorporated herein by reference as thought fully set forth. After a suitable load of hay is pressed onto the indexing platform, a gate 28 descends and prevents further hay from being moved onto the platform. The gate 28 is preferably a blade or shear that is vertically reciprocable on guide rods 30 by means of a ram or the like 32. Thereafter, the indexing ram moves the charge of hay into the inlet side of the compression chamber of the press.

The indexing ram comprises a hydraulic ram or cylinder 34 mounted on a support frame 36. A piston rod 38 is connected to the ram piston (not shown) at one end and to a platen or ram head 40, which engages and moves bales 42 sequentially in the compression chamber 16 of the press.

The charge for the bale of hay is typically a standard one-hundred ten pounds, but may be increased a slight amount, such as to one-hundred eleven to one-hundred twelve pounds to accommodate or compensate for waste in further processing, including the cutting of the bales into suitable size. After the charge of hay 42 is loaded into the compression chamber 16, a compression cylinder 44 is activated by high pressure hydraulic fluid, forcing a platen or ram head 46 forward and the bale forward into the end of the compression chamber 48.

An extruder cylinder 50 having a ram head 52 on the outer end of the piston rod thereof is then actuated, forcing the bale transverse to the longitudinal axis of the compression chamber into the strapping chamber 18. An air cylinder 54 is mounted at the end of the compression chamber, with a rod 56 that extends into engagement with the bale 42 to hold it together as it is moved into the extrusion chamber 48. The bale 42 is then forced laterally into the strapping or banding chamber, thereby maintaining the bale in its original orientation. As the bale is moved into the strapping chamber, it is positioned for the placement of a first set of straps, which are placed on the bale by means of a plurality of banding machines as illustrated. These banding machines are preferably of the type available from the STRAPAC Company under the trademark "Sivaron", with a Model No. SS-80Y being the most suitable.

These banding machines are disclosed in the company's instruction manual entitled SIVARON, SS-80Y.SS-80T, which is incorporated herein by reference as though fully set forth. These machines have been developed for the placing of banding straps about packages and the like. Typically, such machines have a rectangular track which surrounds a support table for receiving packages and the like, which are strapped or banded while supported on the table. The machines are typically electrically operated and cycle automatically when activated.

In the present invention, four of these banding machine raceways are positioned to encircle the extrusion or strapping chamber, with the machines 60, 62, 64 and 66 in alternate arrangement. The strapping chamber is constructed to have peripheral slots that extend around the entire chamber, and enable the bands to be pulled into the chamber and bound around the bales of hay. The bales are suitably indexed to place two pairs of bands thereon. These are placed in pairs as the bale is indexed.

The bale is then extruded from the strapping chamber to a cutting unit or chamber 68 where a cutting means, such as a double edge knife blade, is passed vertically through the bale to sever it into two uniform size and weight bales suitable for handling and shipping. In the illustrated embodiment, a double edged knife blade 70 is mounted on a carriage frame 72, mounted for vertical reciprocable movement on vertical guides 74, and moved vertically by means of a hydraulic cylinder 76 for cutting a bale on each stroke. The cylinder 76 has a connecting rod 78 connected to the carriage 72. The cutting chamber may be a simple extension of the strapping chamber. These resulting bales will be on the order of approximately fifty-five pounds.

The strapping chamber, as illustrated in FIG. 3, is constructed to enable the banding raceways to pass around the chamber, yet to have sufficient strength to retain a bale in its compressed form. As illustrated, the chamber comprises a plurality of longitudinally spaced vertically extending complementary pairs of side plates, having a center section forming the side of the chamber, with upper and lower extensions extending upward to and connecting to horizontally extending upper and lower support beams 80 and 82. The upper beam 80 comprises a plate having down turned sides 84, and an end portion 86 extending downward and secured along an edge of a pair of plates 88 and to the end of upper end chamber plate 90. The bottom beam 82 has an identical complementary construction, with side flanges 92 and an end portion or panel 94 extending downward to a bottom chamber plate 96. Side plates 88 and top and bottom plates 90 and 96 form a first portion of the rectangular strapping or banding chamber.

Top and bottom plates 98 and 100 are secured between a pair of side plates 102, and are further supported by upper and lower stand off members 104 and 106, secured thereto and extending at an angle to and secured to the respective upper and lower support beams 80 and 82. This forms a longitudinally spaced section of the strapping chamber, and provides a peripheral banding slot 108 between the first two sections of the chamber. The upper and lower ends of the side plates 88 and 102 are narrowed to provide upper and lower slots 110 and 112 for the upper and lower legs of a banding raceway 114 for banding raceway 60.

Three additional sections of the strapping chamber are constructed in the same manner to provide three additional sections to accommodate the strap raceways of strapping machines 62, 64 and 66. This provides a chamber as can be seen having annular slots completely through the chamber at spaced points or positions along the longitudinal axis thereof for receiving straps. It further provides an arrangement having slots, through which the raceways of the banding machines can extend above and below the strapping chamber. The straps can then be extended around the chamber, through the raceways, and then tensioned to pull them through the slots in the chamber walls into contact and engagement with the bale of hay therein.

Figure 4:
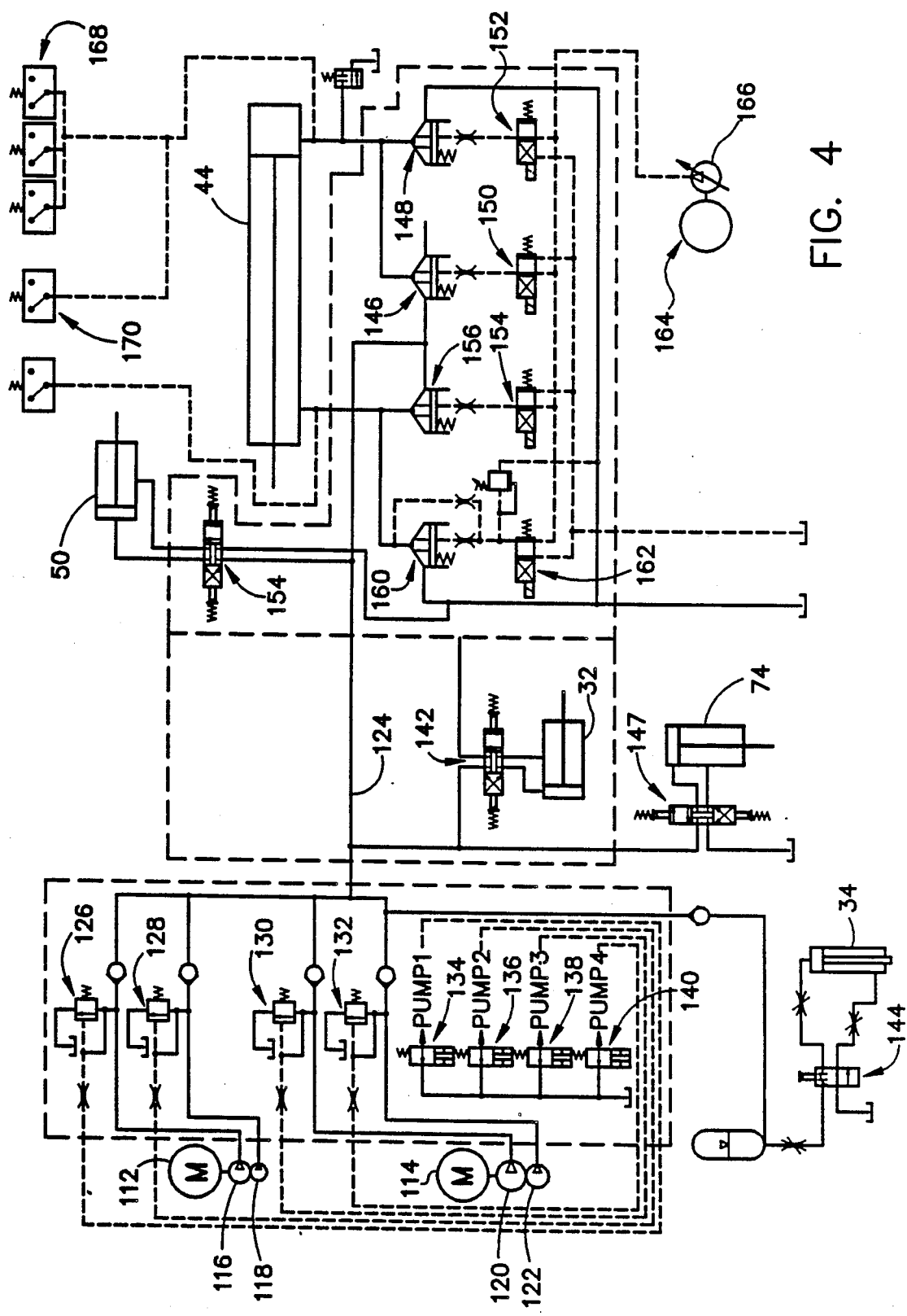
FIG. 4 is a schematic illustration of a hydraulic system of the embodiment of FIG. 1.

Referring now to FIG. 4 of the drawings, a schematic illustration of an exemplary hydraulic system for the present baling system is illustrated. The system is powered by a pair of motors 112 and 114, which in the illustrated embodiment are electric motors but may be diesel, gasoline or other suitable motors. These each drive a pair of pumps 116, 118, 120 and 122, respectively, which provides pressurized hydraulic fluid to a main supply line 124. Each of the pumps is provided with a pilot operated vent valve, designated by the numerals 126, 128, 130, and 132, generally. These valves are controlled by solenoid valves 134, 136, 138 and 140, which in turn are controlled by a CPU or the like. The supply line of high pressure fluid is provided to a number of valves which are either solenoid or pilot operated to supply fluid to the various linear motors for operation of the system.

The first motor to operate in this sequence of operation is the gate or stop motor 32 for stopping the material being fed from the conveyor onto the scale 24 of the indexing unit. This motor 32 is controlled by a valve 142, which is solenoid operated by the CPU through a suitable electrical system as will be described. After this motor is operated, the indexing motor 34 is operated by a valve 144, which is also solenoid operated as will be explained. Following the indexing of a charge into the machine, the main ram motor 44 is operated by means of valves 146 and 148, which are pilot operated by pilot valves 150 and 152. The valve 146 opens to supply high pressure fluid to the head end of the main ram 144, while exhaust valve 160 opens to vent the rod end of the ram for the main compression stroke for compressing the bale to its reduced size. When the ram has completed its main stroke, an extruder ram 50 is operated by its control valve 154 for moving the bale laterally into the strapping chamber. The main ram 44 is then retracted by operation of its main retraction valve 156, which is operated by a pilot valve 158. Venting of the head side of this piston is controlled by an exhaust valve 146 operated by its pilot valve 150.

Pilot fluid for operation of the pilot operated valves, as explained above, is provided by a ten horse power motor 164 driving a variable displacement pump 166. A plurality of pressure responsive switches 168 and 170 may be operated by the fluid supplied to the main ram for controlling other functions of the system and for stopping the system when over pressurization should occur.

The above motors and valves may be available from any suitable valve company and various valves may be utilized. One source of such valves is the Vickers Company of Troy, Mich. through their valve catalog No. I-3640-S, revised Nov. 1, 1988. Other suitable sources of valves are also available.

Referring to FIG. 5 of the drawing, a functional block diagram of the CPU operation of the machine, as controlled by the respective valves, is illustrated. The system is preferably set up to be either manually or automatically operated. In the preferred embodiment, the system is computer controlled in an automatic mode, such that the computer sequentially controls the valves and the components of the system in a manner to provide a continuous automatic operation of the system. As shown in FIG. 5, the CPU preferably controls the respective valves and switches in a suitable sequence to provide continuous automatic operation of the system. The system thus has appropriate sensing switches for sensing the positions of various components of the system, such that the computer is capable of initiating the appropriate function in the appropriate time sequence.

In accordance with operation of the system, the operation is initiated by powering the system up, with the motors driving the pumps to establish a predetermined pressure in the power system. The pilot control motor and pumps are operated to provide the necessary pilot control where appropriate. The CPU, which has been previously programmed to initiate and control operation of the system, is activated to initiate operation of the system. The system begins by operation of conveyor 12 for feeding hay onto the indexing table 24, where an appropriate amount or quantity of hay is selected by weighing, for example, and then activating the gate or knife 28 for cutting off the flow of hay onto the table or scale. The indexing cylinder 39 then moves the hay into the compression chamber 16, wherein the compression ram 44 is activated to compress the hay into the compression chamber, where the extruding cylinder is then actuated to force the bale laterally into the strapping chamber. As the bale is moved into position in the strapping chamber, a first pair of strapping machines are activated to apply the first set of straps to the bale. Thereafter, the bale is further indexed to a second position, wherein a second pair of straps are applied to the bale, and the bale then moved to a position to be cut by the bale cutter into two miniature size bales. The bales are then ejected and then stacked for shipping or the like.

While I have illustrated and described my invention by means of specific embodiments, it is to be understood that numerous changes and modifications may be made therein without departing from the spirit and scope of the invention as defined in the appended claims.

I claim:

1. A hay bale recompacting apparatus for further compacting bales of hay comprising in combination:

a compression chamber defined by top, bottom, side and end walls;

an inlet opening in a side wall at one end of said compression chamber;

a compression ram at said one end of said chamber for compressing a bale therein;

an outlet opening at the other end of said chamber;

indexing means including a horizontal platform extending outward from said inlet opening and a ram for selecting and moving a selected amount of precompressed hay from a plurality of bales on said platform into said chamber;

a strapping chamber disposed at a right angle to and at the outlet of said compression chamber for receiving compressed bales from said compression chamber for strapping while in the compressed state, said strapping chamber comprising a pair of vertically spaced longitudinally extending support beams, and a plurality of independent chamber sections positioned end to end in spaced relation and supported from and between said beams for defining a plurality of banding slots therebetween;

an extruder ram for extruding bales from said compression chamber into said strapping chamber; and strapping means comprising four strapping units associated with said strapping chamber and operative in pairs for applying a first pair of straps when a bale is at a first position and for applying a second pair of straps when said bale is in a second position for strapping bales in said strapping chamber.

2. A hay bale recompacting apparatus according to claim 1 wherein:

said strapping means comprises a guideway encircling said strapping chamber and aligned with each of said banding slots, feeder means for automatically feeding a strap around said chamber in response to a bale position, tensioning means for tensioning said strap, and securing means for securing said strap around a bale.

3. A hay bale recompacting apparatus according to claim 1 wherein:

said compression chamber includes a bale pressure cylinder for opposing said compression ram.

4. A hay bale recompacting apparatus according to claim 1 wherein:

said indexing means includes a scale for weighing a selected amount of precompressed hay to be introduced into said bale compressor; and said indexing means is responsive to the weight of said selected amount of precompressed hay on said scale for activating said indexing means.

5. A hay bale recompacting apparatus according to claim 1 further comprising:

cutting means at an outlet of said strapping chamber for cutting said bale along a center line into two bales.

6. A hay bale recompacting apparatus according to claim 1 further comprising:

a hydraulic system for operation of said compression ram and said extruder ram; and computer means for controlled operation of said hydraulic system.

7. A hay bale recompacting system comprising in combination:

an elongated compression chamber having a generally rectangular cross-section defined by top, bottom, side and end walls;

said compression chamber having an inlet end and an outlet end, an inlet opening at said inlet end in one side of said chamber, and an outlet at said outlet end in the other side of said chamber;

a compression ram at said inlet end of said chamber for compressing a bale therein;

indexing means comprising a horizontal platform extending outward from said inlet opening for receiving bales of hay and means for moving a selected amount of a bale of hay into said chamber;

a strapping chamber at said outlet comprising a pair of vertically spaced horizontally extending support beams, and a plurality of independent chamber sections positioned end to end in spaced relation and supported from and between said beams for defining a plurality of banding slots therebetween disposed at right angle to said compression chamber for receiving compressed bales from said compression chamber;

an extruder ram for extruding bales from said compression chamber into and from said strapping chamber; and strapping means associated with said strapping chamber for strapping bales in said strapping chamber and comprising a guideway encircling said chamber at each of said banding slots, feeder means for automatically feeding a strap around said chamber in response to a bale position, tensioning means for tensioning said strap around a bale, and securing means for securing said strap around said bale.

8. A hay bale recompacting system according to claim 7 wherein:

said compression chamber has a length for receiving at least one standard bale of hay; and said strapping chamber has a width of less than half the length of the compression chamber.

9. A hay bale recompacting system according to claim 8 further comprising:

a hydraulic system for operation of said compression ram and said extruder ram; and computer means for controlled operation of said hydraulic system.

10. A hay bale recompacting system according to claim 9 wherein:

said compression chamber includes a bale pressure cylinder at said outlet end for opposing said compression ram.

11. A hay bale recompacting system according to claim 10 further comprising:

cutting means at an outlet of said strapping chamber for cutting said bale along a center line into two bales of equal size and weight.

12. A system recompacting and resizing a bale of hay comprising in combination:

an elongated compression chamber having a generally rectangular cross-section defined by top, bottom, side and end walls, said compression chamber has a length for receiving at least one standard bale of hay;

said compression chamber having an inlet end and an outlet end, an inlet opening at said inlet end in one side of said chamber, and an outlet at said outlet end in the other side of said chamber;

a hydraulic compression ram at said inlet end of said compression chamber for compressing bales therein;

indexing means comprising scale means for weighing a selected amount of hay to be introduced into said bale compressor, and means responsive to the weight of said selected amount on said scale for activating said indexing means, and means for moving said selected amount of a bale into said compression chamber;

a strapping chamber at said outlet disposed at right angle to said compression chamber for receiving compressed bales from said compression chamber, said strapping chamber has a width of less than half the length of the compression chamber, said strapping chamber comprises a pair of vertically spaced longitudinally extending support beams, and a plurality of independent chamber sections positioned end to end in spaced relation and supported from and between said support beams for defining a plurality of banding slots therebetween;

a hydraulic extruder ram for extruding bales from said compression chamber into and from said strapping chamber;

strapping means associated with said strapping chamber for strapping bales in said strapping chamber, said strapping means comprises a guideway encircling said chamber at each of said banding slots, feeder means for automatically feeding a strap around said chamber in response to a bale position, tensioning means for tensioning said strap, and securing means for securing said strap around a bale; and cutting means at an outlet of said strapping chamber for cutting said bale along a center line into two bales of equal size and weight.

13. A hay bale recompacting system according to claim 12 further comprising:

a hydraulic system for operation of said compression ram and said extruder ram; and computer means for controlled operation of said hydraulic system.

14. A hay bale recompacting system according to claim 13 wherein:

said compression chamber includes a bale pressure cylinder at said outlet end for opposing said compression ram.

15. A hay bale recompacting system for recompacting previously compacted hay to a higher density comprising in combination:

an elongated compression chamber having a generally rectangular cross-section defined by top, bottom, and end walls;

said compression chamber having an inlet end and an outlet end, an inlet opening at said inlet end in one side of said chamber, and an outlet at said outlet end in the other side of said chamber;

a ram at said inlet end of said chamber for compressing bales therein;

feeding means for selectively feeding a predetermined weight charge of previously compacted hay into said compression chamber comprising platform scale means for receiving and weighing a charge of hay to be introduced into said bale compression chamber, conveyor means for feeding previously compacted hay onto said platform scale means, and means responsive to a predetermined weight of a charge on said scale for interrupting the feeding of said hay onto said platform, and for enabling means for moving said charge into said compression chamber;

a strapping chamber at said outlet disposed at right angle to said compression chamber for receiving compressed bales;

an extruder ram for extruding bales from said compression chamber into and from said strapping chamber; and strapping means associated with said strapping chamber for strapping bales in said strapping chamber.

16. A hay bale recompacting system according to claim 15 wherein said means responsive to a predetermined weight of a charge on said scale for interrupting the feeding of broken bales of hay onto said platform comprises a gate normally disposed in a non-interrupting position above said conveyer and and moveable to an interrupting position in response to said predetermined weight.

17. A hay bale recompacting system according to claim 15 wherein said means for moving said charge into said compression chamber comprises a ram.

18. A hay bale recompacting system according to claim 15 wherein said compression chamber has a length for receiving at least one standard bale of hay; and said strapping chamber has a width of less than half the length of the compression chamber.

19. A hay bale recompacting system according to claim 18 wherein:

said strapping chamber comprises a pair of vertically spaced horizontally extending support beams; and a plurality of independent chamber sections positioned end to end in spaced relation and supported from and between said beams for defining a plurality of banding slots therebetween.

20. A hay bale recompacting system according to claim 19 wherein said means responsive to a predetermined weight of a charge on said scale for interrupting the feeding of broken bales of hay onto said platform comprises a gate normally disposed in a non-interrupting position above said conveyor and moveable to an interrupting position in response to said predetermined weight.

21. A hay bale recompacting system according to claim 20 wherein said means for moving said charge into said compression chamber comprises a ram.

22. A hay bale recompacting system according to claim 21 further comprising:

a hydraulic system for operation of said rams and said indexing means; and computer means for controlled operation of said hydraulic system.

23. A hay bale recompacting system according to claim 21 wherein:

said strapping means comprises a guide way encircling said chamber at said slots, feeder means for automatically feeding a strap around said chamber in response to a bale position, tensioning means for tensioning said strap around a bale, and securing means for securing the ends of said strap together.

24. A hay bale recompacting system according to claim 23 further comprising:

cutting means at an outlet of said strapping chamber for cutting said bale along a center line into two bales of equal size and weight.

* * * * *